Jan. 5, 1932.  L. L. VIVERETT  1,839,816
LICENSE TAG MOUNTING
Filed March 19, 1931
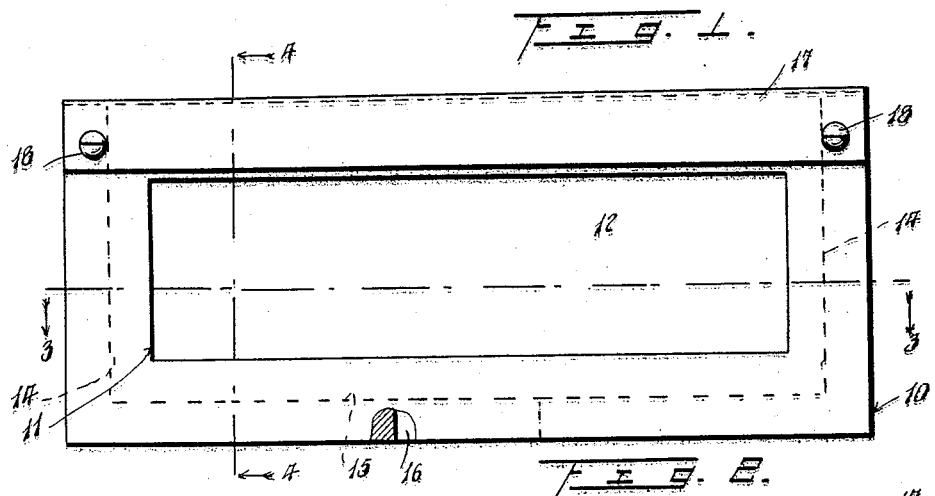
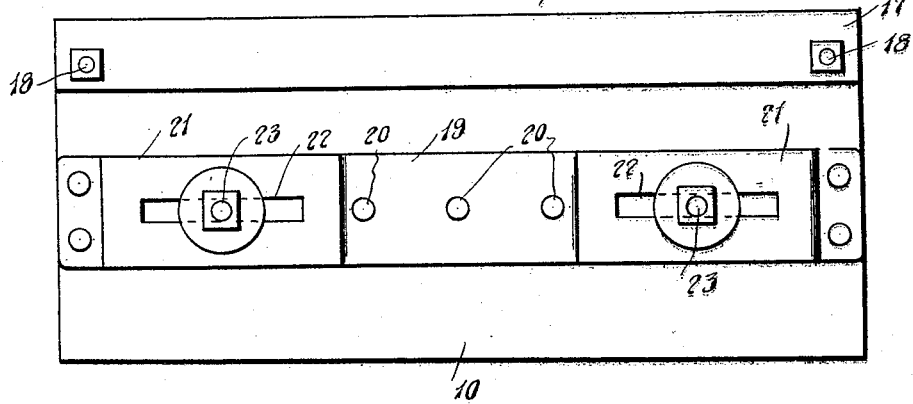
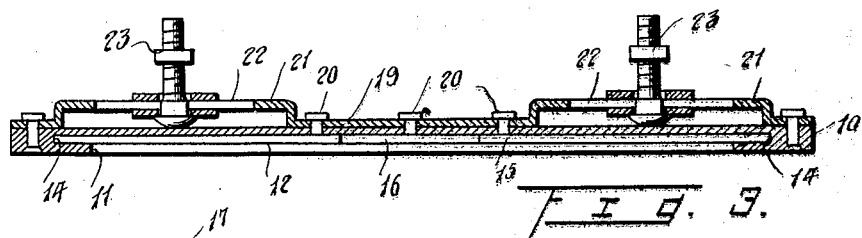
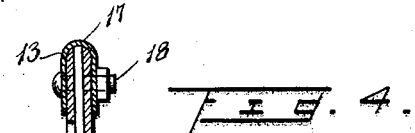
Inventor
L. L. Viverett.
By L. F. Kendrick Jr.
Attorney Patented Jan. 5, 1932

1,839,816

UNITED STATES PATENT OFFICE

LANCE L. VIVERETT, OF UNION, MISSISSIPPI

LICENSE TAG MOUNTING

Application filed March 19, 1931. Serial No. 523,841.

This invention relates to a holder, container or mounting means for an automobile license tag.

It is particularly aimed to provide a device which will be serviceable as well as ornamental and which may be made of rust-proof material and manufactured to fit all automobiles or other vehicles.

It is particularly aimed to provide a novel construction whereby water will not reach the plate and water will not collect within the holder or container but will drain therefrom.

Another object is to provide a novel construction wherein the main container or holder body may be made from a single piece of metal.

Various additional objects and advantages will become apparent from a consideration of the description following taken in connection with accompanying drawings illustrating an operative embodiment.

In said drawings:—

Figure 1 is a front view, partly broken away, of the improved license tag mounting, Figure 2 is a rear view, Figure 3 is a longitudinal sectional view on a plane indicated by the line 3—3 of Figure 1, and Figure 4 is a transverse sectional view on a plane indicated by the line 4—4 of Figure 1.

Referring specifically to the drawings, 10 designates the main container or holder body which is preferably made in a single piece of metal, preferably of a water-proof nature and which may be highly shined or polished.

At one side, the body 10 has an opening 11 through which the license plate 12 may be observed. Such license plate 12 is inserted into the holder or container section 10 through an open top 13 and it is held in place in the container by slots or grooves 14 and 15, provided in the ends and bottom. To prevent the collection of rain within the holder, a drain opening 16 is provided in the bottom of the holder, the same communicating with the slot 15.

The open top of the holder is closed by a U-shaped bar 17, which extends across the same, straddling. The bar 17 is held in place by detachable bolts 18 which pass therethrough and through the body 10. Due to the shape of the bar 17, it will prevent the entrance of moisture and foreign matter into the holder.

Any suitable means may be used to secure the device in place to the automobile. To this end, an attaching strap 19 is riveted or otherwise secured as at 20 to the body 10. The strap 19 has two offset portions 21 provided with elongated slots 22 adjustably mounting attaching bolts 23, adapted to be secured to suitable parts or elements on the automobile or other vehicle.

Various changes may be resorted to provided they fall within the spirit and scope of the invention.

I claim as my invention:—

A holder for a license tag comprising a holding body having an opening through which the tag may be viewed, said holder having an opening at the top for insertion of the tag and being slotted about said opening to hold the tag in place, said body having a drain opening leading from the lowermost slot, a U-shaped closure bar straddling the body at the top and closing the insert opening, bolts securing said bar to the body, a strap secured to the rear of the body, and fastening means on the strap adapted for engagement with a mounting vehicle.

In testimony whereof I affix my signature.

LANCE L. VIVERETT.